May 14, 1968  W. P. MENASHI  3,383,163
TREATMENT OF SURFACES
Filed Jan. 24, 1964  2 Sheets-Sheet 1

INVENTOR.
Wilson P. Menashi
BY
Attorney

May 14, 1968 W. P. MENASHI 3,383,163
TREATMENT OF SURFACES

Filed Jan. 24, 1964 2 Sheets-Sheet 2

INVENTOR.
Wilson P. Menashi
BY
Attorney

United States Patent Office 3,383,163
Patented May 14, 1968

3,383,163
TREATMENT OF SURFACES
Wilson P. Menashi, Lexington, Mass., assignor to Arthur D. Little, Inc., Cambridge, Mass., a corporation of Massachusetts
Filed Jan. 24, 1964, Ser. No. 339,923
12 Claims. (Cl. 21—54)

ABSTRACT OF THE DISCLOSURE

A method for treating surfaces of materials which do not lend themselves to induction heating, such as glass, plastics and ceramics to render them sterile, i.e., free from microorganisms. The method comprises exposing the surface to a plasma for a time sufficient to destroy the microorganisms but insufficient to effect any physical change in the surface material. It is particularly well suited to the sterilization of the internal walls of glass and plastic containers.

---

A wide variety of pharmaceuticals, foodstuffs, and beverages are dispensed in glass or plastic containers, and in many cases it is necessary that the surfaces of these containers which are to come in contact with the material contained be sterile or free from any microorganisms such as bacteria and the like. Heating such containers to a temperature which is sufficient to destroy the microorganisms is the general technique used in sterilizing. In the case of glass containers it is desirable, for the sake of economy, to use the cheapest grades of glass having thermodynamic properties and coefficients of thermal expansion which do not permit rapid heating and cooling. This in turn means that in order to sterilize ordinary glass containers, or even those formed of some of the more expensive grades, it is necessary to slowly heat and then slowly cool them to effect the sterilization. Since it is impractical in a large-scale filling operation to handle each container in this manner individually, it is customary to sterilize a large quantity of containers at one time. This in turn requires that the glass containers then be stored under completely sterile conditions until they can be filled.

Many plastic materials do not have melting points which permit intensive heat sterilization, and those that do require heating over a period of time and then subsequent cooling. Although the problem of the coefficient of thermal expansion in plastics may not be so marked as in the case of glass, cooling must still be accomplished and the plastic containers must be maintained under sterile conditions until filled. Similar problems arise in the case of ceramic articles.

Although some filling processes will permit hot filling many will not, thus necessitating having cool containers for filling. For example, many pharmaceuticals cannot be heated for filling and many foodstuffs would be overcooked if it were necessary to keep them hot for filling.

Inasmuch as materials such as glass, plastics and ceramics are not electrically conducting they do not lend themselves to induction heating, and dielectric heating is impractical for a surface treatment. It would therefore be desirable to have available a method for sterilizing glass, plastic, and ceramic surfaces which would not require storing and handling under sterile conditions until filled. Preferably such a method of sterilizing should be an additional step in the container filling procedure and integrated and timed with it.

It is therefore a primary object of this invention to provide an improved method of sterilizing surfaces of glass, plastics, ceramics and like materials. It is another object to provide a method of the character described which is suitable for sterilizing surfaces to render them free of microorganisms. It is yet another object of this invention to provide a method of sterilizing containers which can be incorporated into a container filling assembly line in a manner so that the containers may be sterilized immediately prior to filling, thus eliminating the necessity for storing them under sterile conditions until they can be filled.

It is another object of this invention to provide apparatus for sterilizing surfaces of glass, plastics and ceramics. It is still another object of this invention to provide apparatus of the character described which can be incorporated into a filling assembly line and made an integral part thereof. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed description, and the scope of the invention will be indicated in the claims.

For a fuller understanding of the nature and objects of the invention, reference should be had to the following detailed description taken in connection with the accompanying drawings in which.

Sterilization is achieved by exposing the surface to be sterilized to a plasma for a very brief period of time, normally not longer than one-tenth of a second. It is not completely understood by what mechanism this exposure destroys the microorganisms without apparently affecting the surface of the glass or plastic. The temperature of the plasma does not lend itself to accurate measurements, but it is known that it is far higher than that which would rapidly melt the glass or decompose the plastic if the surface were exposed to the temperature for any period of time. It therefore appears that under the conditions described the plasma attacks only the skin of the surface and that within the time period little if any heat is transferred to the body of the glass or plastic. This conclusion is borne out by the fact that containers thus sterilized inside are cool to the touch and can be readily handled immediately after treatment. Thus it appears that there is little if any heat transferred to or across the glass wall.

In order to achieve plasma sterilization, it is necessary to contact the surface only momentarily and this in turn requires that the plasma be generated and reach its full intensity within a very short but finite time, e.g., of the order of a few milliseconds. It is also of course necessary to be able to turn off the plasma once the sterilization has been accomplished and to sweep away any of the hot gas from the surface being treated in order that no undue heat is transferred to it. Thus, what is required is a "pulsed" plasma. In the following description the term "plasma" is used to define a highly or substantially completely ionized body of gas at extremely high temperature and composed of positively charged nuclei and negatively charged electrons. Any means capable of providing this type of pulsed plasma are suitable for plasma sterilization as described herein.

Figure 1:
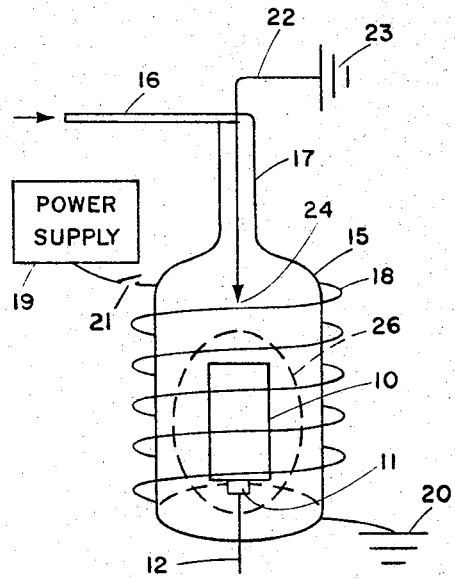
FIG. 1 illustrates a test set-up used to evaluate the method and apparatus in sterilizing glass slides.

FIG. 1 illustrates a test set-up used to evaluate the efficiency of plasma sterilization. This figure also illustrates an apparatus modification suitable for sterilizing solid bodies, such as slides, or the exterior of a body.

In assessing the efficiency of this method and apparatus as a means for sterilizing surfaces, glass microscope slides were introduced with different concentrations of bacteria on the slide, and it was found that concentrations up to $4 \times 10^6$ spores per square inch were totally destroyed in less than $\frac{1}{10}$ of a second. In the apparatus of FIG. 1 a glass slide 10, held by means of clamp 11, is positioned through a support 12 within a glass envelope 15, the bottom of which is open to the atmosphere. The envelope terminates in a neck 17 which has a gas inlet conduit 16 communicating into it. Around envelope 15 is a coil 18, one end of which is electrically connected to ground 20, and the other to a suitable high voltage power supply 19, through suitable switching means 21. The switching means is diagrammatically represented. An electrode 22 passes down through the neck 17 of the glass envelope into the interior of the envelope. The electrode is connected to ground 23 and within the envelope it terminates in a point 24 (drawn as an arrow to better illustrate it) which is located at a position corresponding to the high voltage end of the coil 18. By pulsing a voltage of approximately 7,000 volts into coil 18 there is established between point 24 and coil 18 a corona discharge which very rapidly generates a plasma 26 of the gas, e.g., argon, introduced through the gas inlet conduit 16 into envelope 15. The plasma can be generated and turned off at will merely by turning the power supply on and off.

In the establishment of a corona discharge it is of course necessary to provide a sufficient voltage gradient between the electrode point 24 and the coil 18 to ionize the gas used to form the plasma. The use of a corona discharge to form an induction plasma in effect achieves a "self-starting" plasma and employs the same means to provide initial ionization as well as to sustain it. Various circuits capable of generating the corona discharge to produce a pulsed plasma are known.

Figure 2:
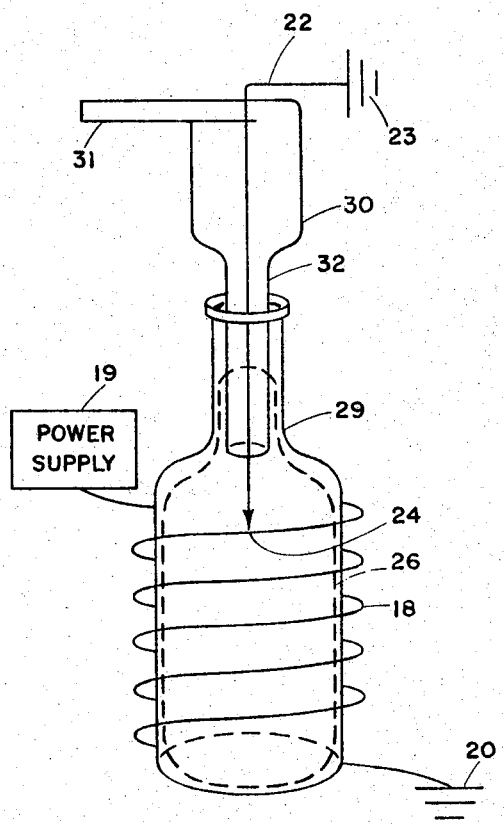
FIGS. 2–4 illustrate various modifications of the apparatus.
Figure 3:
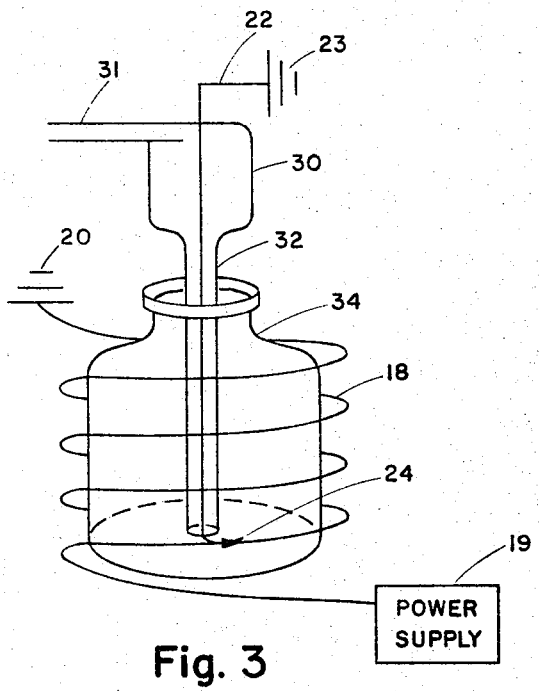
Figure 4:
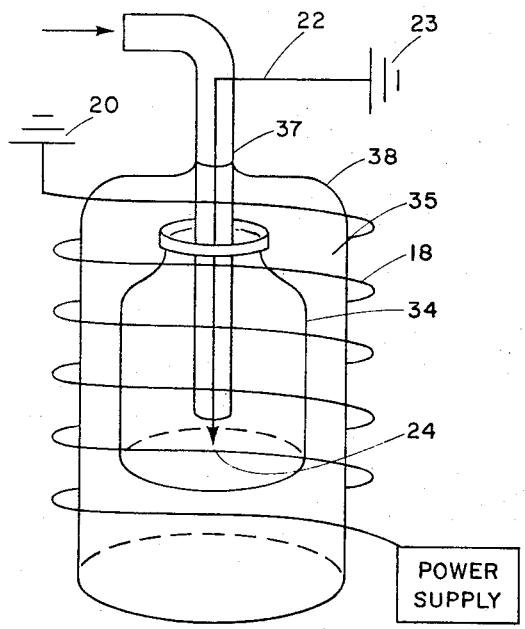

FIGS. 2–4 illustrate the application of plasma sterilization to various types of glass or plastic containers, and in these figures like numbers refer to like elements described in FIG. 1. In FIG. 2 bottle 29 is sterilized in accordance with the practice of this invention by supplying within the container a flow of ionizable gas suitable for forming a body of plasma. This is conveniently done with a suitable gas supplying reservoir 30 equipped with a gas inlet conduit 31 and means for directing the flow of gas into the container such as neck 32 which in this case is inserted into the bottle 29. If desired, the gas may be directed tangentially into reservoir 30, thus giving it a swirling motion which is at least partially retained within the bottle 29. In the arrangement in FIG. 2 the corona discharge responsible for generating the plasma is located at the top of the botle and the flow of gas insures the distribution of the plasma over the entire inner surface of the bottle 29.

In FIG. 3 the neck 32 of the gas introducing means extends almost to the bottom of the wide-mouthed bottle 34 which is to be sterilized. Likewise the electrode 22 extends through this neck and the electrode point 24 is located near the bottom of the bottle. This of course means then that the high power side of the coil 18 must be at the bottom rather than at the top as in FIG. 1 or 2. The plasma-forming gas flows down through neck 32 and sweeps the plasma formed at the corona discharge up through the bottle and out through its opening.

FIG. 4 illustrates an apparatus modification which permits the sterilization of the outside as well as the inside of a bottle 34. In this modification the means for providing an ionizable gas comprises a conduit 37 which extends almost to the bottom of the inside of the jar 34 and an outer envelope 38 which defines a plasma containing volume 35 around the jar 34. By introducing an ionizable gas, e.g., argon, into conduit 37 and providing sufficient power to coil 18, the corona initiates a plasma within the jar 34 and the plasma then spreads to fill the envelope 38 thus sterilizing both the internal and external walls of container 34.

Figure 5:
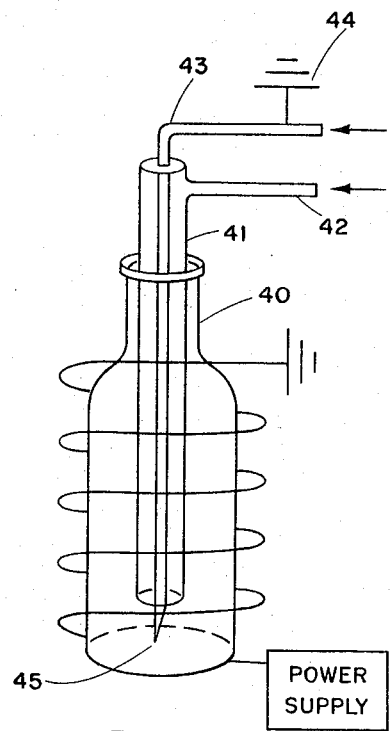
FIG. 5 illustrates a modification of the apparatus in which two different gases are supplied for ionization to form a plasma.

FIG. 5 illustrates an apparatus designed to use two different ionizable gases to form the plasma. For example it may be desirable to use a nitrogen plasma. However, it is much more difficult, particularly as far as power requirements are concerned, to generate a nitrogen plasma due to its diatomic nature than it is an argon plasma, for example. The use of an argon plasma as a pilot to initiate the formation of the nitrogen plasma makes the use of a nitrogen plasma much more feasible. In the apparatus of FIG. 5 a bottle 40 is sterilized by inserting into it a tube 41 which has a gas inlet line 42 suitable for introducing nitrogen, for example, into the bottle. The electrode in this case is a small-diameter tungsten tube 43 which is capable of introducing argon into the bottle. This tungsten tube 43 is grounded at 44 and terminates within the bottle at a sharp point 45 thus providing the necessary configuration for the establishment of a corona discharge between it and the coil 18. Once this corona discharge is created, nitrogen flowing in the annular space defined by tube 41 and tungsten tube 43 is ionized, a plasma is formed of the nitrogen, and the interior wall of the bottle is sterilized.

Figure 6:
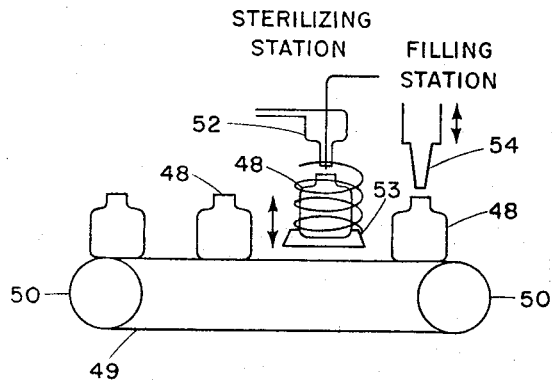
FIG. 6 illustrates in somewhat simplified form a container filling assembly line showing the apparatus of this invention as an integral part thereof.

FIG. 6 illustrates, in simplified form, how the plasma sterilization method and apparatus of this invention may be incorporated into an automated bottle filling operation. Bottles 48 which are to be filled are placed on a suitable moving means such as an endless belt 49 which is periodically advanced by rolls 50 by means not shown. At the sterilizing station there is provided means 53 for picking up and raising the bottle into position within the sterilizing equipment designated generally by numeral 52. As an alternative, means may be provided for moving the sterilizing equipment downwardly over the bottle. Once the bottle has been sterilized, it is returned to its position on belt 49 which advances the now sterile bottle to the filling station to be filled by suitable filling means 54. It is of course possible to use one sterilizing station for a number of filling lines and the sterilizing and filling operations can be timed and coordinated to meet any set of conditions.

In the formation of a plasma it is of course necessary to ionize the gas provided for plasma formation. Preferably such a gas is a monatomic gas such as argon, helium, xenon, and the like. FIG. 5 illustrates apparatus in which it is possible to use a readily ionizable gas to initiate plasma formation in another gas such as nitrogen. It is also of course possible to use diatomic gases such as nitrogen to form the plasma, provided however sufficient voltage drop is created between the coil and the electrode point. Although many gases may be used, argon is preferable since it is inert, non-toxic, and readily available. It may not be advisable to use air or oxygen in forming the plasma since by-product nitrous oxide or ozone, respectively, will be formed in using these gases and means must be provided to remove these undesirable gases prior to filling a container.

The manner in which the ionizable gas is supplied to the container or around the body to be sterilized may be any way which is suitable for providing a quantity of the gas to the volume in which the plasma is formed. The figures illustrate typical introducing means and the gas may be delivered to these either as a single mass prior to plasma formation or it may be continuously circulated during the existence of the plasma.

From the description of the apparatus of FIGS. 1 through 5 it will be seen that the equipment is operated at atmospheric conditions which is, of course, advantageous both with respect to ease of operation and economy. If pressurized gas is used, then the voltage required to form the plasma will be greater and although it is possible to use pressurized gases, no real advantage will be realized.

The actual voltage required to form the plasma will depend upon a number of factors, including the sharpness of the discharge point, the frequency of the current supplied, the gas used in forming the plasma and the volume defining the plasma. It is therefore not possible to indicate a specific voltage range since it varies from system to system. Optimum voltage may be readily determined for any one system of gas and container to be sterilized. In general, the sharper the discharge point, the less voltage is required; and the lower the frequency used, the larger will be the size of the plasma which is formed. This means that the larger sized bottles can be sterilized using power having lower frequencies. As pointed out above, the gas used has a great influence upon the power requirement for creating the plasma. For example, to generate a plasma in nitrogen gas requires from two to five times the voltage required to generate a plasma in argon under otherwise the same operating conditions.

Typically, root mean square (RMS) voltages of about 5000 volts will be adequate for forming an argon plasma, with peak voltages being 6000 to 7000 volts.

It will be appreciated from a general knowledge of plasmas that the time period over which the surface is actually exposed to these extremely high temperatures must be relatively short. Exposure times depend upon the material being treated and the plasma being used; and they should, of course, be of sufficient duration to destroy the microorganisms on the surface but less than that which will effect any appreciable physical change in the surface, i.e., less than that which will melt the glass, degrade the plastic or fuse the ceramic surfaces. In general, it is preferred that exposure times should be no longer than about one-tenth of a second for glass and somewhat less than that for plastic surfaces. It is apparently sufficient to treat only the skin of the glass or plastic wall.

Plasma sterilization has a number of advantages which have been pointed out and which may be summarized as including high efficiency, ability to sterilize individual pieces just prior to filling, no requirement of cooling and ability to be integrated directly into a filling assembly.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:
1. Method of sterilizing the surface of a material which does not conduct electricity and which has a relatively low thermal conductivity, characterized by the step of contacting said surface with a gaseous pulsed plasma at extremely high temperatures for a period of time which is less than that required to effect any appreciable physical change in said surface but sufficient to destroy any microorganisms present thereon.

2. Method in accordance with claim 1 wherein said gaseous plasma is formed of argon.

3. Method in accordance with claim 1 wherein said material is glass.

4. Method in accordance with claim 1 wherein said material is a plastic.

5. Method in accordance with claim 1 wherein said period of time does not exceed one-tenth of a second.

6. Method of sterilizing the interior of a container formed of a material which does not conduct electricity and which has a relatively low thermal conductivity, comprising the steps of
    (a) introducing an ionizable gas into said container; and
    (b) rapidly ionizing said gas thereby forming a plasma within said container, the duration of the existence of said plasma being less than that required to effect any appreciable physical change in the surface of said container.

7. Method in accordance with claim 6 wherein said ionizing is accomplished by creating a corona discharge within said gas.

8. Method in accordance with claim 6 wherein said container is glass.

9. Method in accordance with claim 6 wherein said container is plastic.

10. Method in accordance with claim 6 wherein said gas is argon.

11. Method of sterilizing the interior of a container formed of a material selected from the group consisting of glass, plastic, and ceramic, comprising the steps of
    (a) introducing into said container a first readily ionizable gas;
    (b) rapidly ionizing said first readily ionizable gas thereby to form an initial plasma; and
    (c) introducing a second less readily ionizable gas within said container to form a primary plasma body the formation of which is initiated by said initial plasma; the total duration of said initial plasma and said primary plasma being less than that required to effect any appreciable physical change in the surface of said container.

12. Method in accordance with claim 11 wherein said readily ionizable gas is argon and said less readily ionizable gas is nitrogen.

References Cited

UNITED STATES PATENTS

| 2,919,370 | 12/1959 | Giannini et al. | 313—231 |
| 2,922,869 | 1/1960 | Giannini et al. | |
| 2,929,952 | 3/1960 | Giannini et al. | 313—231 |
| 3,015,745 | 1/1962 | Klein | 313—231 X |
| 3,077,108 | 2/1963 | Gage et al. | 313—231 X |
| 3,087,209 | 4/1963 | Monk | 21—78 X |
| 3,173,248 | 3/1965 | Curtis et al. | 313—231 X |

FOREIGN PATENTS

| 831,922 | 4/1960 | Great Britain. |

JOSEPH SCOVRONEK, *Primary Examiner.*

MICHAEL E. ROGERS, *Examiner.*

D. C. CONLIN, *Assistant Examiner.*